US00RE38702E

(19) United States
(12) Reissued Patent
Clement et al.

(10) Patent Number: US RE38,702 E
(45) Date of Reissued Patent: Feb. 15, 2005

(54) SECURITY SYSTEM

(75) Inventors: Richard Marc Clement, Pontardawe (GB); Stephen Davies, West Glamorgan (GB)

(73) Assignee: Innovation 2 Market Limited, Swansea (GB)

(21) Appl. No.: 09/487,832

(22) PCT Filed: Feb. 11, 1993

(86) PCT No.: PCT/GB93/00287

§ 371 (c)(1),
(2), (4) Date: Feb. 20, 1996

(87) PCT Pub. No.: WO93/17404

PCT Pub. Date: Sep. 2, 1993

Related U.S. Patent Documents

Reissue of:
(64) Patent No.: 5,710,540
Issued: Jan. 20, 1998
Appl. No.: 08/284,585
Filed: Feb. 20, 1996

(30) Foreign Application Priority Data

Feb. 11, 1992 (GB) ..... 9202831
May 20, 1992 (GB) ..... 9210734

(51) Int. Cl.[7] ..... G08B 13/14
(52) U.S. Cl. ..... 340/572.4; 340/5.9; 340/551
(58) Field of Search ..... 340/572.1, 572.3, 340/825.34, 825.32, 825.3, 551, 505, 10.1

(56) References Cited

U.S. PATENT DOCUMENTS

| | | | | | |
|---|---|---|---|---|---|
| 3,898,619 | A | | 8/1975 | Carsten et al. | 340/152 |
| 4,135,184 | A | * | 1/1979 | Pruzick | 340/572 |
| 4,242,576 | A | * | 12/1980 | Lundgren | 340/825.34 |
| 4,274,090 | A | * | 6/1981 | Cooper | 340/572 |
| 4,308,530 | A | * | 12/1981 | Kip et al. | 340/572 |
| 4,471,345 | A | | 9/1984 | Barrett, Jr. | 340/572 |
| 4,656,463 | A | * | 4/1987 | Anders et al. | 340/572 |
| 4,686,513 | A | | 8/1987 | Farrar et al. | 340/572 |
| 4,724,427 | A | | 2/1988 | Carroll | 340/572 |
| 4,816,824 | A | * | 3/1989 | Katz et al. | 340/825.34 |
| 4,857,893 | A | | 8/1989 | Carroll | 340/572 |
| 4,870,391 | A | * | 9/1989 | Cooper | 340/572 |
| 4,918,296 | A | * | 4/1990 | Fujisaka et al. | 235/380 |
| 4,924,171 | A | * | 5/1990 | Baba et al. | 323/347 |
| 4,962,369 | A | | 10/1990 | Close | 340/572 |
| 5,005,125 | A | | 4/1991 | Farrar et al. | 364/403 |
| 5,068,655 | A | | 11/1991 | Gabillard et al. | 340/988 |
| 5,081,445 | A | * | 1/1992 | Gill et al. | 340/572 |

(List continued on next page.)

FOREIGN PATENT DOCUMENTS

| | | | |
|---|---|---|---|
| EP | 0101955 | | 3/1984 |
| EP | 0112493 | * | 7/1984 |

OTHER PUBLICATIONS

International Preliminary Examination Report, PCT/GB93/00287.

*Primary Examiner*—Thomas Mullen
(74) *Attorney, Agent, or Firm*—Gordon & Jacobson, P.C.

(57) ABSTRACT

Unauthorized removal of articles e.g. from a retail store, each article carrying a read/write tag, is detected by a security system having at least one point-of-sale apparatus (30) arranged to write specific data into (or erase specific data from) the tag to indicate that the article has been paid for, and a detector apparatus (40) for the or each exit of the store and arranged to read each tag to determine if the specific data has been written into (or erased from) the tag, and otherwise to initiate an alarm. The system also includes a refunds/returns detector apparatus (50) to read the tag of each article presented to it, to determine if the specific data has been written into (or erased from) the tag, and to erase (or write in) that data so that the article can be returned to stock.

44 Claims, 2 Drawing Sheets

U.S. PATENT DOCUMENTS

| | | | | |
|---|---|---|---|---|
| 5,099,226 | A | | 3/1992 | Andrews ..... 340/572 |
| 5,103,222 | A | | 4/1992 | Hogen Esch et al. ... 340/825.54 |
| 5,153,583 | A | | 10/1992 | Murdoch ..... 340/825.54 |
| 5,164,985 | A | | 11/1992 | Nysen et al. ..... 380/9 |
| 5,214,409 | A | | 5/1993 | Beigel ..... 340/572 |
| 5,216,419 | A | | 6/1993 | Fujisaka et al. ..... 340/825.54 |
| 5,235,326 | A | | 8/1993 | Beigel et al. ..... 340/825.54 |
| 5,257,011 | A | | 10/1993 | Beigel ..... 340/572 |
| 5,372,386 | A | * | 12/1994 | Mills ..... 340/825.34 |
| 5,382,952 | A | | 1/1995 | Miller ..... 340/825.54 |
| 5,404,147 | A | | 4/1995 | Drucker et al. ..... 343/742 |

* cited by examiner

SECURITY SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a security system to detect unauthorised removal of articles from a restricted area, such as a retail store.

2. State of the Art

Various systems have been adopted in retail outlets to combat fraud. In one type of system, a tag is attached to each article of clothing or other merchandise, and must be removed before the article is taken out of the store, otherwise a detector at the exit door senses the tag and sets off a general audible alarm. However, another form of fraud which is developing consists of the fraudster removing an article from one part of the store, then taking it to the "returns" desk and claiming a cash refund.

SUMMARY OF THE INVENTION

We have now devised a security system of improved effectiveness and which is able to counter the above-described form of fraud.

In accordance with this invention, there is provided a security system to detect unauthorised removal of articles from a restricted area such as a retail store, in which each article carries a read/write tag, the security system comprising at least one-point-of-sale or point-of-authorisation apparatus arranged to write specific data into (or erase specific data from) the tag to indicate that the article has been paid for or its removal has otherwise been authorised, and a detector apparatus for the or each exit of said restricted area, said detector apparatus being arranged to read each tag to determine if said specific data has been written into (or erased from) the tag and otherwise to initiate an alarm.

The security system preferably further comprises a refunds/returns detector apparatus arranged to read the tag of each article presented to it and to determine if said specific data has been written into (or erased from) the tag, and to erase (or write in) said data so that the article can be returned to stock.

For example the point-of-sale apparatus may write into the tag data representing the date of sale and the actual price paid for the article. Then the refund/returns detector erases the data and price-paid data.

Preferably the security system also includes detector equipment for installing internally of the store (for example at passageways between departments or at stairways or escalators between floors), this detector equipment being arranged to read the tags of articles passing them to determine whether any of those articles has not yet been paid for: preferably each such detector equipment is arranged to initiate a low level or discrete alarm, which is available to staff but not to customers. Such a detector may also be arranged as a personal detector to be worn or carried by a member of staff, e.g. providing a discrete audible alarm to an ear piece worn by that member of staff.

Preferably also the detector equipment at each exit location, or at each internal fixed location, comprises at least one ferrite core aerial used in scanning mode. For example, a plurality of such ferrite core aerials may be spaced apart along one transverse dimension of the exit or other passageway (e.g. across its width) and directed generally perpendicular to that dimension (e.g. vertically). The aerials are then switched on one-by-one in succession to scan across the exit or other passageway. Alternatively, a ferrite core aerial may be mounted to a drive apparatus which moves the aerial to scan back-and-forth across the exit or other passageway.

Embodiments of this invention will now be described by way of examples only and with reference to the accompanying drawings, in which:

DETAILED DESCRIPTION OF THE PREFERRED EMBODIMENTS

In accordance with this invention, each article of merchandise to be sold in a store carries a tag to which data can be written and from which data can be read. The tag generally comprises a small flat semiconductor chip: in the case of garments, the chip is preferably bonded to the usual label of the garment. The chip may include an air-core aerial or a ferrite core aerial for inductive coupling with read/write equipment both for powering the chip and for data transfer.

Preferably the manufacturer or wholesaler of the merchandise uses data-write equipment which inductively couples to the tag of each article to write into the tag data such as a code identifying the article, the identity of the manufacturer and/or wholesaler and the date of manufacture.

Figure 1:
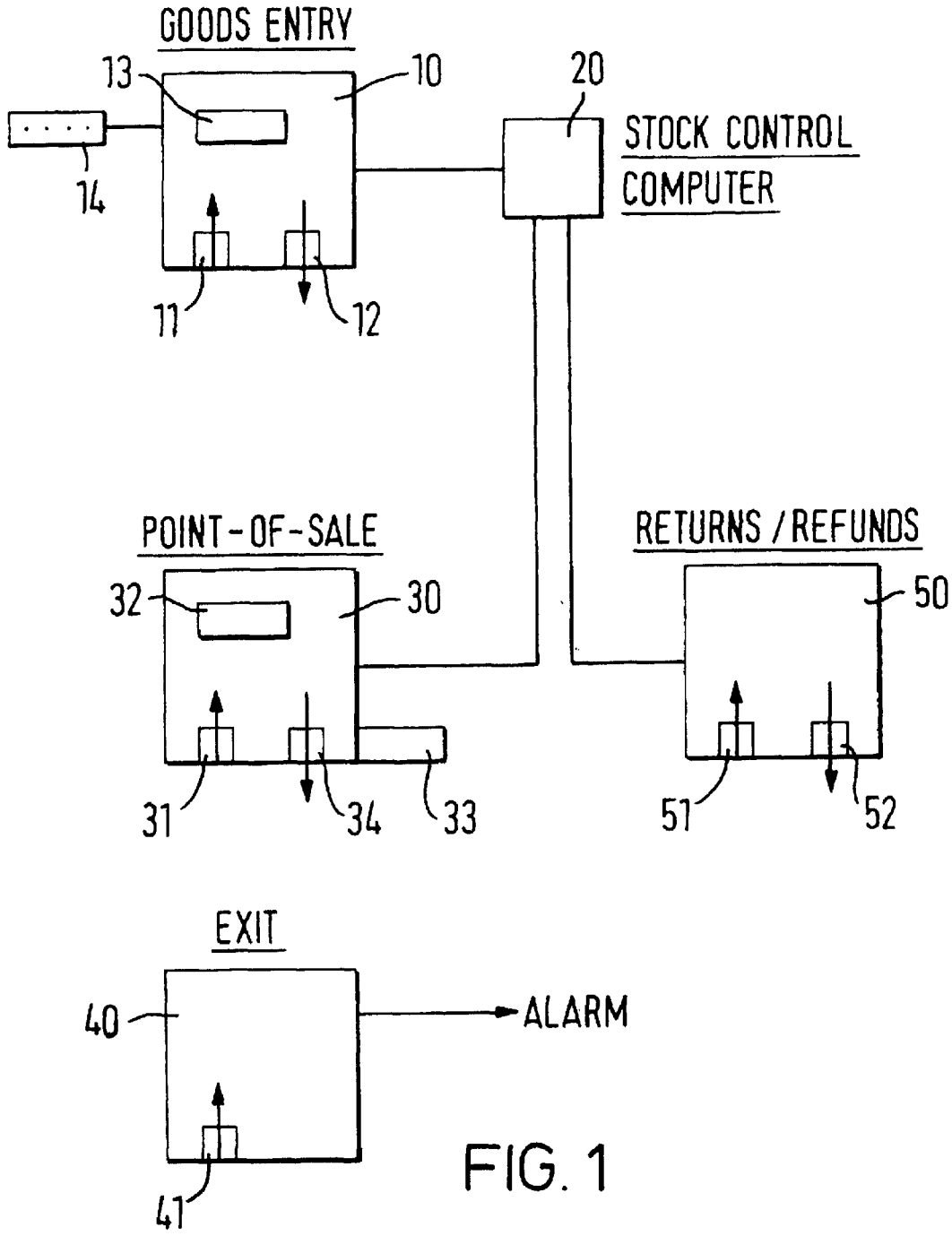
FIG. 1 is a block diagram schematically showing the individual elements of a security system in accordance with this invention.

As shown in FIG. 1 of the drawings, each store has read-write equipment 10 at its goods-entry. This equipment 10 is linked to a stock control computer 20 of the store, and via an inductively-coupling read head 11 reads the tag of each article newly-received into the store to identify the article and add it to the data held by the computer 20. Also via an inductively-coupling write head 12 the equipment 10 writes data to the tag of each article, this data including the identity of the store and the date of receipt of the article. The equipment 10 preferably includes a visual display 13 for showing the data read from each tag and for verifying the data written into each tag. The equipment 10 may also have a keyboard 14 for manually entering any other desired data into the tag memory.

Each store also has at least one point-of-sale, having read/write equipment 30. This equipment is linked to the store's stock control computer 20 which, in addition to maintaining a record of the numbers of the different articles or items of merchandise within the store, also maintains a record of the current price applicable to each different article. The equipment 30 is used to read, via an inductively-coupling read head 31, the tag of each article being purchased: the identity code is read from the tag and the current price of the article is obtained by referring this code to the computer 20. The equipment 30 includes a visual display 32 arranged to display the identity of the article and its current price. The equipment 30 further includes a printer 33 to print a bill or receipt for the customer, the data for this being derived from that read from the tag of each article being purchased. The equipment 30 also includes an inductively-coupling write head 34 which writes data into the tag of each article being purchased, to indicate that the article has been paid for: this data preferably includes the date of the sale and the actual price paid. As each article is purchased, the stock control computer 20 debits its stock control records accordingly.

At the or each exit of the store, a fixed detector 40 is installed to check that every article being taken out of the store has been paid for. Thus, the detector 40 includes an inductively-coupling read head 41 to read data from the tag of each article being taken of the store, to determine whether the tag carries data indicating that it has been paid for (i.e. the data that should have been written in at the point of sale). If the detector 40 fails to read such data, it initiates an alarm.

In an alternative, the point-of-sale equipment 30 may erase a special indicator from the tag memory: then if the exit detector 40 detects the presence of such an indicator (indicating that the customer is carrying an article that has not been paid for), the detector 40 initiates its alarm.

Preferably the store also has detector equipment installed internally of the store, for example at passageways between departments or at stairways or escalators between floors. Normally customers would pay for the goods from one department or floor before moving to another department or floor: these detectors can therefore monitor movements of merchandise within the store, being arranged (similar to the exit-detectors) to read the tags of articles passing them to determine whether those articles have been paid for at one of the store's points-of-sale. Preferably these in-store detectors are arranged to initiate a low level or discrete alarm enabling staff to discretely monitor customers: for example the alarm may consist of a light positioned to be visible only by members of staff, e.g. a security guard. Such a detector may also be carried or worn by an in-store security guard, who can then discretely screen any customer within the store: in this case the alarm may be an audible alarm e.g transmitted to an ear plug.

The store also has a refunds or returns department, which includes read/write equipment 50. When a customer returns an article to this department, the equipment 50 is used via its inductively-coupling read head 51 to read the tag to check that the article had been paid for and to determine the date of purchase and the price paid. This information is erased from the tag memory via an inductively-coupling write head 52 of the equipment 50: also the identity of the store and date of receipt is written into the tag, and the store's stock control records are updated, so that the article can be placed back on sale within the store.

It will be appreciated that although separate read and write heads are shown in each of the items of equipment 10, 30 and 50, each pair of read and write heads (e.g. 11 and 12) may comprise a single aerial.

Figure 2:
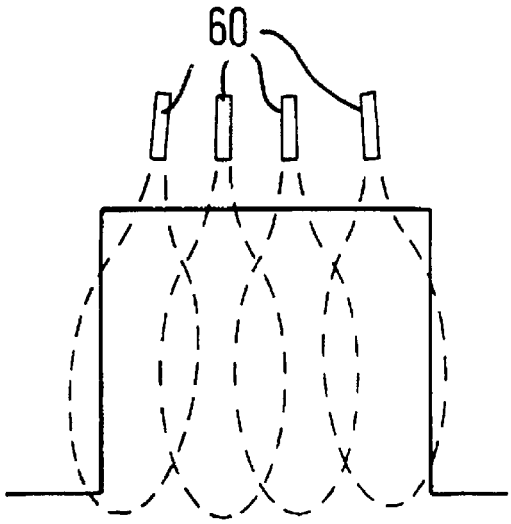
FIG. 2 is a front view of an exit doorway from a retail store, showing diagrammatically a scanning-mode detector aerial array.
Figure 3:
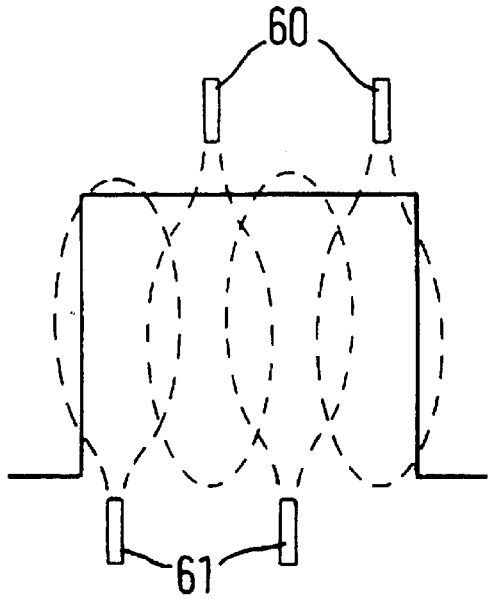
FIG. 3 is a similar view of an exit doorway, showing diagrammatically an alternative form of scanning mode detector aerial array.
Figure 4:
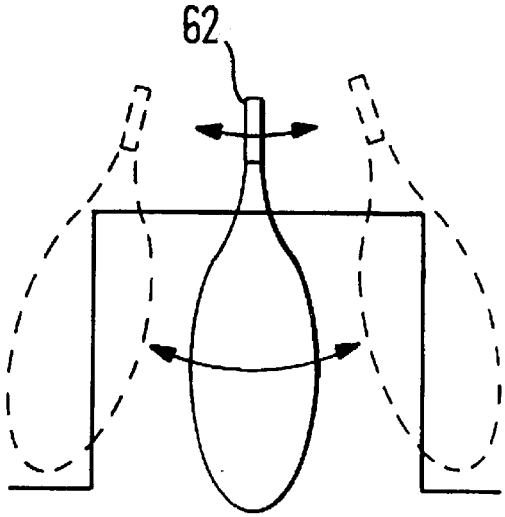
FIG. 4 is a similar view of an exit doorway, showing diagrammatically another from of scanning-mode aerial.

Referring to FIG. 2, the detector equipment at each exit or internal fixed location of the store preferably comprise an array of ferrite core aerials 60 spaced apart across the width of the exit and directed vertically: for example as shown the aerials may be positioned above the exit and directed downwardly. The effective field of each aerial is shown by dotted lines, and is generally in the shape of an elongated pear which extends the height of the exit but is relatively narrow. In use, the aerials 60 are switched one-by-one to effect a scan across the width of the exit. As shown in FIG. 3, alternate aerials 60, 61 may be positioned above and below the exit. Instead, the array(s) may be spaced apart up the vertical side(s) of the exit and directed across its width. As shown in FIG. 4, there may be a single aerial 62 which is continuously energised and mounted to a drive apparatus which moves (e.g. pivots or linearly displaces) the aerial 62 back-and-forth across the exit, effectively in a scanning mode.

We claim:

1. A security system for detecting unauthorized removal of goods from a restricted area having at least one goods entry and at least one goods exit, in which each of the goods carries a read/write tag, the security system comprising:

a) first read/write means at the at least one goods entry;

[b) second read/write means at the at least one goods exit;]

[c)]*b*) stock control computer means linked to said first read/write means for reading/writing first specific data from/to the respective tag of each of the goods entering the restricted area;

[d)]*c*) at least one point of authorization means having [third] *second* read/write means, said [third] *second* read/write means being linked to said stock control computer means and arranged to change second specific data on the respective tag to indicate that the exit of the goods from the restricted area has been authorized;

[f)]*d*) at least one fixed detector means at the at least one goods exit for reading [each] *a* tag of the goods to determine if said second specific data have been changed on the tag;

[g)]*e*) means for initiating an alarm if said fixed detector means determines no change of said second specific data; and

[h)]*f*) at least one refunds/returns detector means having [fourth] *third* read/write means, said [fourth] *third* read/write means for reading the respective tag of each of the goods presented to said refunds/returns detector means and to determine if said second specific data have been changed on the tag, and to change said second specific data.

2. A security system according to claim 1, wherein:

[said read/write tag comprises a semiconductor chip to which data can be written and from which data can be read] *said second read/write means is linked to said stock control computer means and arranged to delete or write second specific data on the respective tag to indicate that the exit of the goods from the restricted area has been authorized;*

*said at least one fixed detector means at the at least one goods exit determines if said second specific data have been deleted or written on the tag;*

*said fixed detector means determines whether no second specific data has been deleted or written on the tag; and*

*said at least one refunds/returns detector means determines if said second specific data have been deleted or written on the tag.*

[3. A security system according to claim 2, wherein:

said semiconductor chip includes an air core aerial or a ferrite core aerial for inductive coupling with any of said read/write means.]

4. A security system according to claim 1, wherein:

said first read/write means is arranged to read the respective tag of each of the goods entering said area to identify the goods and add said first specific data to said stock control computer means.

5. A security system according to claim 1, wherein:

said first read/write means is arranged to write said first specific data to the respective tag of each of the goods, said first specific data including the identity of the restricted area and the date of receipt of the goods.

6. A security system according to claim 1, wherein:

said first read/write means includes a visual display for showing said first specific data has been read/written from/to each tag of the goods.

7. A security system according to claim 1, wherein:

said first read/write means further includes a keyboard for manually entering other data into the tag of the goods.

8. A security system according to claim 1, wherein:

said stock control computer means is arranged to maintain a record of the numbers of different goods and a record of the current price for each of the different goods.

9. A security system according to claim 1, wherein:

said [third] *second* read/write means is arranged to read an identity code from the respective tag of each of the goods being purchased.

10. A security system according to claim 9, wherein:

said identity code is referred to said stock control computer means to obtain the current price of each of the goods.

11. A security system according to claim 1, wherein:

said [third] *second* read/write means is arranged to write data to the respective tag of each of the goods being purchased, said data including the date of sale and the actual price paid.

12. A security system according to claim 1, wherein:

said [third] *second* read/write means includes a visual display.

13. A security system according to claim 1, wherein:

said [third] *second* read/write means is connected to a printer to print a bill or a receipt.

14. A security system according to claim 1, wherein:

said [fourth] *third* read/write means is arranged to read the respective tag of the goods to check that the goods have been paid for and to determine the date of purchase and the price paid.

15. A security system according to claim 14, wherein:

said [fourth] *third* read/write means is arranged to erase said second specific data from the tag and to write said second specific data to the tag, including the identity of the restricted area and the date of receipt of the goods.

16. A security system according to claim 1, wherein:

said fixed detector means is arranged to read the respective tag of each of the goods, to determine whether the tag carries data indicating that each of the goods has been paid for, and, upon failure to indicate that each of the goods has been for, to initiate said alarm means.

17. A security system according to claim 1, wherein: said fixed detector means is within said restricted area and is arranged to monitor movements of the goods within the restricted area and to read the tags of the goods passing said fixed detector means to determine whether the goods have been paid for, and otherwise to initiate an alarm.

18. A security system according to claim 1, wherein:

said fixed detector means comprises at least one ferrite core aerial arranged to act in a scanning mode.

19. A security system according to claim 1, wherein:

said at least one fixed detector means includes a plurality of spaced apart ferrite core aerials, and means for switching said aerials one by one in scanning mode.

20. A security system according to claim 1, wherein:

said fixed detector means comprises a ferrite core aerial mounted to drive means, which drive means is arranged to displace said aerial in scanning mode.

21. A security system for detecting unauthorized removal of goods from a restricted area having at least one goods entry and at least one goods exit, in which each of the goods carries a semiconductor chip to which data can be written and from which data can be read, the security system comprising:

a) first read/write means at the at least one goods entry;

[b) second read/write means at the at least one goods exit;]

[c)]*b*) stock control computer means linked to said first read/write means, to read/write first specific data from/to a respective said semiconductor chip of each of the goods entering the restricted area;

[d)]*c*) at least one point of authorization means having [third] *second* read/write means, said [third] *second* read/write means being linked to said stock control computer means, arranged to change second specific data on the respective semiconductor chip to indicate that the exit of the goods from the restricted area has been authorized;

[e)]*d*) at least one fixed detector means at the at least one goods exit, arranged to read each tag of the goods to determine if said second specific data have been changed on said semiconductor chip;

[f)]*e*) means for initiating an alarm if said fixed detector means determines no-change of said second specific data; and

[g)]*f*) at least one refunds/returns detector means having [fourth] *third* read/write means, said [fourth] *third* read/write means for reading the respective semiconductor chip of each of the goods presented to said refunds/returns detector means and for determining if said second specific data have been changed on the semiconductor chip, and to change said second specific data.

22. A security system for detecting unauthorized removal of good from a restricted area having at least one goods entry and at least one goods exit, in which each of the goods carries a read/write tag, the security system comprising:

a) first read/write means at the at least one goods entry;

[b) second read/write means at the at least one goods exit;]

[c)]*b*) stock control computer means linked to said first read/write means, for reading/writing first specific data from/to the respective tag of each of the goods entering the restricted area;

[d)]*c*) at least one point of authorization means having [third] *second* read/write means, said [third] *second* read/write means linked to said stock control computer means and arranged to change second specific data on the respective tag to indicate that the exit of the goods from the restricted area has been authorized;

[e)]*d*) at least one fixed detector means at said at least one goods exit for reading each tag of the goods and for determining if said second specific data have been changed on the tag; and

[f)]*e*) means for initiating an alarm if said fixed detector means determines no change of said second specific data, said fixed detector means having at least one ferrite core aerial mounted to a drive apparatus which is arranged to displace the aerial in a scanning mode across said at least one goods exit.

*23. A security system to detect unauthorized removal of articles from a restricted area such as a retail store, in which each article carries a read/write tag, the security system comprising:*

*at least one point-of-sale or point-of-authorization apparatus arranged to write specific data into (or erase specific data from) the tag to indicate that the article has been paid for, or its removal has otherwise been authorized;*

*a detector apparatus for the or each exit of said restricted area, said detector apparatus being arranged to read each tag to determine if said specific data has been written into (or erased from) the tag and otherwise to initiate an alarm; and*

*a refunds/returns detector apparatus arranged to read the tag of each article presented to it and to determine if said specific data has been written into (or erased from) the tag, and to erase (or write in) said data so that the article can be returned to stock.*

*24. The security system of claim 23, wherein the read/write tag comprises a semiconductor chip to which data can be written and from which data can be read.*

*25. The security system of claim 24, wherein the semiconductor chip includes one of an air core aerial and a ferrite core aerial for inductive coupling with any of the point-of-sale or point-of-authorization apparatus, the detector apparatus and the refunds/returns detector apparatus.*

*26. The security system of claim 23, further comprising:*

*goods entry read/write means at at least one goods entry of the restricted area arranged to read specific goods-identifying data of each tag entering the restricted area and to write additional specific data including the identity of the restricted area and the date of receipt of the goods to the tag.*

*27. The security system of claim 26, further comprising:*

*stock control computer means linked to said goods entry read/write means for receiving and storing said specific goods-identifying data of each tag entering the restricted area.*

*28. The security system of claim 27, wherein the goods entry read/write means further comprises a visual display for showing the specific goods-identifying data read from each tag, and the additional specific data written to each tag.*

*29. The security system of claim 27, wherein the stock control computer means is arranged to maintain a record of the numbers of different goods and a record of a current price for each of the different goods.*

*30. The security system of claim 27, wherein the at least one point-of-sale or point-of-authorization apparatus further comprises:*

*point-of-sale read/write means arranged to read an identity code of a respective tag of each of the goods being purchased.*

*31. The security system of claim 30, wherein said identity code read from the respective tag by said point-of-sale read/write means is referred to said stock control computer means to obtain the current price of each of the goods being purchased.*

*32. The security system of claim 23, wherein the at least one point-of-sale or point-of-authorization apparatus further comprises:*

*point-of-sale read/write means arranged to write data including a date of sale and an actual price paid to the tag.*

*33. The security system of claim 32, wherein the point-of-sale read/write means further comprises:*

*a visual display.*

*34. The security system of claim 32, wherein the point-of-sale read/write means is connected to a printer to print a bill or receipt.*

*35. A security system to detect unauthorized removal of articles from a restricted area such as a retail store, in which each article carries a read/write tag, the security system comprising:*

*at least one point-of-sale or point-of-authorization apparatus arranged to write specific data into (or erase specific data from) the tag to indicate that the article has been paid for, or its removal has otherwise been authorized, and in which said specific data represents the date of sale and the actual price paid; and*

*a detector apparatus for the or each exit of said restricted area, said detector apparatus being arranged to read each tag to determine if said specific data has been written into (or erased from) the tag and otherwise to initiate an alarm.*

*36. The security system of claim 35, wherein the read/write tag comprises a semiconductor chip to which data can be written and from which data can be read.*

*37. The security system of claim 36, wherein the semiconductor chip includes one of an air core aerial and a ferrite core aerial for inductive coupling with any of the point-of-sale or point-of-authorization apparatus and the detector apparatus.*

*38. A security system to detect unauthorized removal of articles from a restricted area such as a retail store, in which each article carries a read/write tag, the security system comprising:*

*at least one point-of-sale or point-of authorization apparatus arranged to write specific data into (or erase specific data from) the tag to indicate that the article has been paid for, or its removal has otherwise been authorized, and in which said specific data represents the date of sale and the actual price paid; and*

*a detector apparatus for the or each exit of said restricted area, said detector apparatus being arranged to read each tag to determine if said specific data has been written into (or erased from) the tag and otherwise to initiate an alarm; and*

*a refunds/returns detector apparatus arranged to read the tag of each article presented to it and to determine if said specific data has been written into (or erased from) the tag, and to erase (or write in) said specific data so that the article can be returned to stock.*

*39. The security system of claim 38, wherein the read/write tag comprises a semiconductor chip to which data can be written and from which data can be read.*

*40. The security system of claim 39, wherein the semiconductor chip includes an air core aerial for inductive coupling with any of the point-of-sale or point-of-authorization apparatus, the detector apparatus and the refunds/returns detector apparatus.*

*41. The security system of claim 39, wherein the semiconductor chip includes a ferrite core aerial for inductive coupling with any of the point-of-sale or point-of-authorization apparatus, the detector apparatus and the refunds/returns detector apparatus.*

*42. A security system to detect unauthorized removal of articles from a restricted area such as a retail store, in which each article carries a read/write tag, the security system comprising:*

*at least one point-of-sale or point-of authorization apparatus arranged to write specific data into (or erase specific data from) the tag to indicate that the article has been paid for, or its removal has otherwise been authorized;*

*a detector apparatus for the or each exit of said restricted area, said detector apparatus being arranged to read each tag to determine if said specific data has been written into (or erased from) the tag and otherwise to initiate an alarm; and*

*at least one ferrite core aerial mounted to a drive apparatus which is arranged to displace said aerial in a scanning mode across said or each exit or another passageway of said restricted area.*

*43. The security system of claim 42, wherein the read/write tag comprises a semiconductor chip to which data can be written and from which data can be read.*

*44. The security system of claim 43, wherein the semiconductor chip includes an air core aerial for inductive coupling with any of the point-of-sale or point-of-authorization apparatus, the detector apparatus and the refunds/returns detector apparatus.*

*45. The security system of claim 43, wherein the semiconductor chip includes a ferrite core aerial for inductive coupling with any of the point-of-sale or point-of-authorization apparatus, the detector apparatus and the refunds/returns detector apparatus.*

* * * * *